Figure 1:
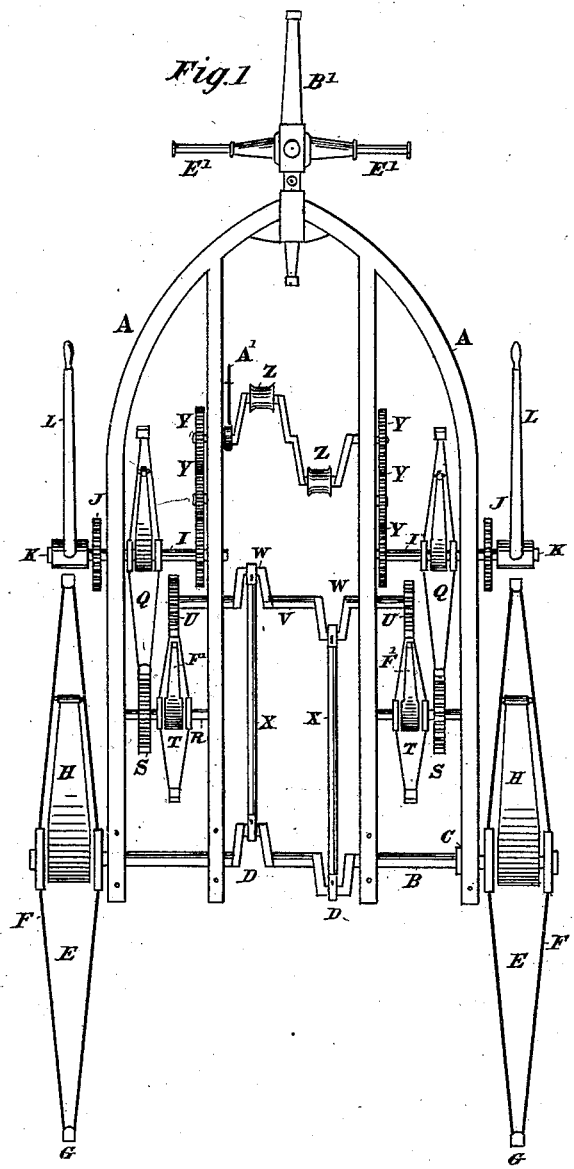

(No Model.) 2 Sheets—Sheet 1.

J. HENRY.
TRICYCLE.

No. 351,768. Patented Nov. 2, 1886.

WITNESSES.
Frank Pardon
C. Hewitt

INVENTOR:
John Henry
by J. G. Hewitt
Attorney (No Model.) 2 Sheets—Sheet 2.

J. HENRY.
TRICYCLE.

No. 351,768. Patented Nov. 2, 1886.

WITNESSES.
Frank Pardon.
C. Hewitt

INVENTOR.
John Henry
by J. G. Hewitt
Attorney

UNITED STATES PATENT OFFICE.

JOHN HENRY, OF LOUISVILLE, KENTUCKY.

TRICYCLE.

SPECIFICATION forming part of Letters Patent No. 351,768, dated November 2, 1886.

Application filed February 19, 1886. Serial No. 192,726. (No model.)

*To all whom it may concern:*

Be it known that I, JOHN HENRY, a citizen of the United States, residing at Louisville, in the county of Jefferson and State of Kentucky, have invented a certain new and useful Improvement in Tricycles; and I do hereby declare that the following is a full, clear, and exact description of the construction and operation of the same, reference being had to the accompanying drawings, forming part of this specification.

This my invention relates to certain new and useful improvements in tricycles, the main wheels of which are made similar to the ordinary bicycle, with scroll-springs between the spokes, and a series of smaller wheels arranged upon shafts in the frame, part of which are made similar to the main wheels, having scroll-springs between the spokes and cog-teeth on the face, which engage with the teeth of small pinions secured upon counter-shafts working in the frame in the rear of the operating-levers.

The object of this my invention is to provide a machine having scroll-springs between the spokes of the main wheels to accumulate power in descending grades, to be expended in ascending the same, and also to prevent the necessity of using one loose wheel in turning, and by means of a series of smaller wheels similarly made, with springs between the spokes and cogs on the face working into small pinions secured upon shafts hinged in bearings at the sides of the frame, thereby greatly increasing the motion transmitted to operate the main wheels, and also to assist in accumulating power by means of the springs in the wheels, to be expended in ascending grades, increasing motion, and to assist in the operation of the machine.

I attain the above object by the mechanism illustrated in the drawings, in which—

Figure 2:
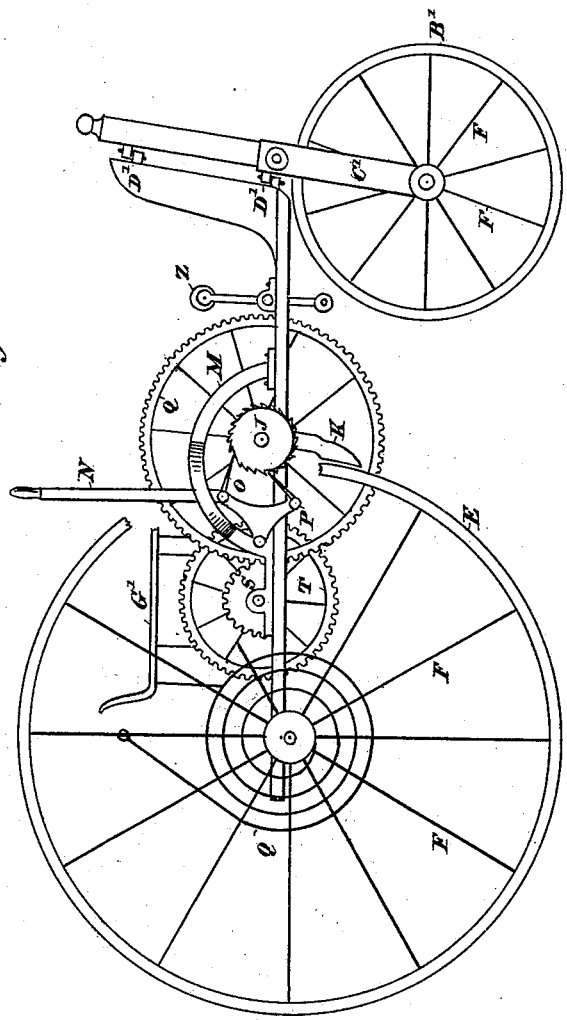

Figure 1 is a top view of the machine, showing the frame and general arrangement of the machinery by which the machine is operated. Fig. 2 is a side elevation of the machine, showing the arrangement of the springs and cog-gearing.

Similar letters refer to similar parts throughout the several views.

In the drawings, A represents the frame of the machine, which may be made of wood or metal, and formed as shown in the drawings, but may be made in any suitable form.

B is the main axle, working loosely in bearings C on the under side of the frame. D D are the cranks by means of which it is operated.

E E are the main driving-wheels, which are made similar to an ordinary bicycle-wheel, working loose on the axle, the hubs of which consist of two flanges working loosely, with a space between them sufficient to receive the scroll-springs, the flanges being filled with metal spokes F, similar to those now in use.

G G are the rims of the wheels, and H H are the scroll-springs between the spokes, which are formed as shown, the inner ends of which are secured firmly to a solid ring or boss fastened permanently upon the axle-spindle between the spoke-flanges of the wheels, while the outer ends are fastened to the spokes of the wheels near the rims, thereby applying the power near the verge of the wheel to operate the machine.

I is the main driving-shaft, which works in bearings on the frame at each side, extending outside the frame sufficient to receive a ratchet-wheel, J, and the machine-brake K, all of which are made as shown, with the brake working loosely on the end of the shaft I, and is operated by the lever L at the sides.

M is a small metal arch secured on the frame over the ratchet-wheel J, to answer as a guide for the operating-lever N, and as a stand, to which it is hinged. This lever N is made in form as shown, and is provided with two pawls, O and P, both of which turn the ratchet-wheel J in the same direction by the alternate movement of the lever N, by which the driver operates the machine.

Q is a wheel secured upon shaft I, made in every respect similar to the main wheels E, with cog-teeth on the face and a scroll-spring between the arms, secured to a permanent boss on the shaft at the inner ends, while the other is attached to the arms near the rims.

R is also a counter-shaft working in bearings on the frame in the rear of shaft I, and S is a small wheel on same shaft, engaging with the wheel Q, by which it is operated, and T is also a wheel working loosely upon shaft R, made in every respect similar to wheel Q, with a scroll-spring, F', between the arms and cog-teeth on the face, which engages with a pinion, U, on the ends of shaft V, by means of which motion is transmitted to operate the machine.

W are the cranks, and X X are the pitman-links.

Z Z are the foot-treadles, and Y Y are a series of wheels for transmitting the treadle motion to operate the driving-shaft I, thereby providing the means for operating the machine either with the hands or feet, or both at the same time, if necessary.

A' is the lever of an eccentric-box bearing of the treadle Z, for throwing it out of gear, when required, by turning the lever down.

B' is the front wheel, which may be made in any suitable form, and C' is the clevis in which it works, and D' are the hinges by which it is attached to the front part of the machine. E' are the levers by means of which it is guided, which may be done by the feet or by the use of reins operated by hand or otherwise.

This invention may be used upon common roads, street-railways, railroads, and any other purpose to which it may be adapted.

In order that others skilled in the art may understand the operation of this my invention, when arranged as herein described and mounted by the rider, ready for use, it is only necessary to lay hold of the levers L and operate them back and forth, by means of which the main axle B, to which the scroll-springs H H are attached, is turned, thereby winding up the springs H, similar to a clock, until a sufficient amount of power is accumulated to operate the machine with sufficient velocity. It is then turned loose, and by means of the already-accumulated power and the additional power still further accumulated by operating the levers L as the machine progresses a very high rate of speed may be attained, and by the same means power may be accumulated to be expended in ascending heavy grades, in connection with the increase of power produced by the levers L when operated by the rider as the machine progresses, and in descending grades the speed is regulated by friction-brakes against the wheels.

What I claim as my invention, and desire to secure by Letters Patent in tricycles, is—

1. In a tricycle having wheels E, working loosely upon the axle-spindle, as above described, the scroll-springs H H between the spokes, with the inner ends secured to a permanent boss on the spindle and to the spokes of the wheel at the outer ends, substantially as described, and for the purpose set forth.

2. In a ratchet device for operating the machine, the combination of the ratchet-wheel J, lever N, pawls O and P, and arch-guide M, substantially as herein described, and for the purpose set forth.

3. In a tricycle having a series of wheels for raising speed and accumulating power, the combination of the shafts I and R, the wheels Q and S and U and T, with the cranks W, pitmen X, and main axle I, substantially as described, and for the purpose set forth.

4. The combination of the wheels Y Y, adjustable treadle Z, with its eccentric boxes, and lever A', substantially as described, and for the purpose set forth.

JOHN HENRY.

Witnesses:
C. HEWITT,
FRANK PARDON.